(12) United States Patent
Rubin (10) Patent No.: US 11,925,960 B2
(45) Date of Patent: *Mar. 12, 2024

(54) SYSTEMS AND METHODS FOR WINNOWING FOOD PRODUCTS

(71) Applicant: Matthew J. Rubin, Indianapolis, IN (US)

(72) Inventor: Matthew J. Rubin, Indianapolis, IN (US)

(73) Assignee: Trade Secret Chocolates, Indianapolis, IN (US)

( * ) Notice: Subject to any disclaimer, the term of this patent is extended or adjusted under 35 U.S.C. 154(b) by 575 days.

This patent is subject to a terminal disclaimer.

(21) Appl. No.: 17/222,838

(22) Filed: Apr. 5, 2021

(65) Prior Publication Data

US 2021/0229132 A1 Jul. 29, 2021

Related U.S. Application Data

(63) Continuation of application No. 15/851,088, filed on Dec. 21, 2017, now Pat. No. 10,994,308.

(Continued)

(51) Int. Cl.
*B02C 19/00* (2006.01)
*A23G 1/00* (2006.01)
(Continued)

(52) U.S. Cl.
CPC .............. *B07B 7/01* (2013.01); *A23G 1/002* (2013.01); *A23G 1/06* (2013.01); *B02C 19/0043* (2013.01);
(Continued)

(58) Field of Classification Search
CPC ..... B02C 11/02; B02C 11/00; B02C 19/0043; B02C 19/0012; A23G 1/06; A23G 1/0043; A23G 1/002; B07B 11/02

See application file for complete search history.

(56) References Cited

U.S. PATENT DOCUMENTS 4,357,864 A * 11/1982 Salete-Garces ........... B02B 3/00
99/518
4,577,552 A * 3/1986 Yamamoto ................ B02B 3/00
99/524

(Continued)

FOREIGN PATENT DOCUMENTS

| CN | 106040356 A | * | 10/2016 | ............. B02C 11/00 |
| CN | 108273603 A | * | 7/2018 | ............. B02C 11/00 |
| CN | 111317148 A | * | 6/2020 | ............. A23N 12/08 |

*Primary Examiner* — Faye Francis
(74) *Attorney, Agent, or Firm* — C. John Brannon; Brannon Sowers & Cracraft PC (57) ABSTRACT

Methods, systems, and apparatus for winnowing. In one aspect, a method includes loading an initial material into a winnowing system via a feed member; feeding the material into a fluidically accelerated winnowing cavity, where the initial material impacts at least one plate member to yield chaff material and processed material, and where the processed material and the chaff material circulate in the winnowing cavity; and separating the chaff material and the processed from the winnowing cavity based on density. Other aspects include yielding intermediate material, where the intermediate material reimpacts the at least one plate member until yielding chaff material and processed material, preprocessing the initial material, controlling the flow of initial material into the winnowing cavity with a feed gate, where the chaff material egresses the winnowing cavity via a chaff chute, where the chaff material collects in a collection cavity, and/or more.

18 Claims, 11 Drawing Sheets

Related U.S. Application Data

(60) Provisional application No. 62/437,117, filed on Dec. 21, 2016.

(51) Int. Cl.
    *A23G 1/06*     (2006.01)
    *B02C 23/16*    (2006.01)
    *B07B 7/01*     (2006.01)
    *B07B 7/04*     (2006.01)
    *B07B 7/083*    (2006.01)
    *B07B 7/086*    (2006.01)
    *B07B 9/02*     (2006.01)

(52) U.S. Cl.
    CPC ................ *B02C 23/16* (2013.01); *B07B 7/04* (2013.01); *B07B 7/083* (2013.01); *B07B 7/086* (2013.01); *B07B 9/02* (2013.01)

(56) References Cited

U.S. PATENT DOCUMENTS

| | | | | |
|---|---|---|---|---|
| 4,832,700 A * | 5/1989 | Kaspar | ................ | C09B 67/0095 264/117 |
| 5,277,370 A * | 1/1994 | Schatz | ................ | B07B 9/02 241/19 |
| 5,579,920 A * | 12/1996 | Garabedian | ................ | B07B 9/02 209/139.1 |
| 6,283,300 B1 * | 9/2001 | Bielagus | ................ | B07B 4/02 209/139.1 |
| 2006/0032952 A1 * | 2/2006 | Kawamoto | ................ | G03G 9/0817 241/40 |
| 2011/0067714 A1 * | 3/2011 | Drewes | ................ | A24C 5/396 131/282 |
| 2011/0132814 A1 * | 6/2011 | Miller | ................ | B07B 7/01 209/139.1 |

* cited by examiner

SYSTEMS AND METHODS FOR WINNOWING FOOD PRODUCTS

CROSS-REFERENCE TO RELATED APPLICATIONS

This application is a continuation of co-pending U.S. patent application Ser. No. 15/851,088, filed on Dec. 21, 2017, which claimed the benefit under 35 U.S.C. § 119(e) of then U.S. Patent Application No. 62/437,117, filed Dec. 21, 2016, both of which are incorporated herein by reference.

BACKGROUND

This specification relates to the field of food ingredient preparation. More specifically, the present technology is in the technical field of winnowing food products, such as cacao.

Cacao beans typically are winnowed in the process of producing chocolate. A whole cacao bean typically may be approximately twelve to fifteen percent by weight chaff and the remainder typically may be the desired food material, which often fractures into pieces known as cocao nibs, or simply nibs. In conventional cacao production, cacao beans are typically dried using a number of techniques (e.g., sun drying, convection air drying, and/or conduction drying), then crushed using convention machines (e.g., hammer or roller mills), and then winnowed using conventions systems and techniques (e.g., hand separation, carpet separation, high-flow, low-RPM tunnel separators, vibratory table sieves). Modern industrial standards typically require no more than 1.5 percent chaff by weight (which equates to an approximate 90% reduction from whole beans) in cacao nibs after winnowing.

Winnowing typically is the process of separating grain, seed, or other food materials from their chaff or shells by blowing a current of air through an unseparated mixture. The lower-density chaff and/or shells travel a greater distance in the air current than the higher-density food product resulting in a separation gradient. The gradient may be then separated into discrete piles resulting in a pile substantially containing chaff, and a pile substantially containing desired materials, such as food products. While there typically may be some cross contamination, the process of winnowing has been used to prepare food material of acceptable quality for thousands of years.

The earliest form of winnowing required two individuals. Whole food would first be crushed, releasing the food material from the chaff, resulting in a loose mixture. One individual would gradually shake unseparated mixture of food material and chaff mixture out of a bowl of at some distance above the ground while a separate person fanned the falling mixture with a cloth, rug, or broad leaf. Wind could also be used to provide the airflow to separate the mixture; however, this could produce an inconsistent result. While this method has the advantage of producing separated food material using limited resources, often in remote locations, it is insufficient for commercial, industrial, or even large-scale home food production.

Early industrial food winnowers of the 19$^{th}$ century essentially replicated this earlier process of manual winnowing using mechanical systems in a controlled environment. A crushed mixture would be placed in hopper above a drift tunnel. The hopper would then discharge a rough stream of mixture down through drift tunnel where a current of air, often supplied by a large bladed fan, would flow from one end of the drift tunnel to the other resulting in horizontal separation of food material. This separation would often be segmented by discrete discharge chutes into a number into discrete grades, each containing different ratios and sizes of chaff and food material. While horizontal drift tunnel winnowers were generally more productive than manual winnowing, but they required relatively large volume drift tunnels in order to sufficiently separate large quantities of mixtures into commercially acceptable grades, which further required large amounts of time and labor to collect and utilize effectively.

Grated winnowers were adopted in the early 20$^{th}$ century to increase winnowing efficiency. Grated winnowers use multiple layers of vibrating grates with sequentially smaller mesh sizes to separate crushed mixtures into mixtures consisting of a small range in particle sizes as they travel horizontally across the grates. A calibrated updraft of air is then used to separate the chaff from the food material at the terminal end of each grate. Since the updraft air current may be specifically calibrated for each grate mesh size, grated winnowers typically are able to achieve higher yields and separation efficiencies when compared to drift tunnel winnowers. The layered design of grated winnowers also enables them to process more material per unit volume compared to drift tunnel winnowers, due to the layered geometry. Unfortunately, the layered approach also makes grated winnowers difficult to clean, due to the tight working spaces and large surface area, and the large size and environmental requirements makes then impractical for smaller spaces or uses. Further, the careful calibration and complexity of cleaning requirements limit the application of grated winnowers in batch processing varieties of food materials.

Vertical drift tubes have been developed recently for batch processing winnowers. These devices use large diameter, substantially vertical tubes with an updraft to separate mixtures according to density. However, vertical drift tubes present many of their own limitations. For example, discharge rates must be consistent must be constantly controlled, air flow must be consistent due to the requirement of the drift tubes to carefully balance of force, and the tube environment presents the inherent problem of material falling down and colliding with material climbing up the tube. Some angled drift tubes designs have been used, such as forty-five degree tube configurations, but the problems of the vertical drift tubes still exist and continue to limit substantial use of drift tube winnowers.

All current winnowers feed at a freefall or drift tube rate that material falls in gravity or slower with vertical drift tubes. Therefore there is a need for a new system and method that can batch process variable feed stock at a high volumetric processing rate in highly efficient and easy to clean manner, and result in high ratio of separation.

Conventional techniques for winnowing cocao inefficient and/or cumbersome, often requiring a large working space, great amounts of time, and an intensive amount of concentration. These conventional systems additionally are prone to clogging due to over- or under-feeding of product, chaff flow, food material collisions, and/or the like. These techniques and systems are often not easily integrated into other stages of production due to their environmental requirements and/or high maintenance and operation requirements. Further, all current winnowing systems rely on freefall or carefully calibrated drift tube for batch processing speeds, which is slow and inefficient. Therefore, what is needed therefore is a more efficient and effective winnowing system and method capable of batch processing variable feed stock at high processing rates.

The present novel technology addresses these needs.

SUMMARY

This specification describes technologies relating to food ingredient preparation. More specifically, the present technology is in the technical field of winnowing food products, such as cacao.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often though may not occur, and that the description includes instances where said event or circumstance occurs and instances where it does not.

The present novel winnower typically utilizes a downdraft of fluid (typically air) to draw the food material/chaff mixture from a hopper into the downdraft section of the winnowing chamber cavity. A diverter wall then transitions the downdrafted mixture flow from substantially vertical to substantially horizontal, where it traverses the winnowing cavity and collides abruptly with a ballistic plate member. This fluidically accelerated mixture impacting typically may then release a substantial portion of any residual chaff that may remain bonded to food material and/or otherwise fracture desired food products.

Fluid (typically air) drawn up from a lower chute (e.g., a nib discharge) also traverses the winnowing chamber with mixed food/chaff material, thereby causing the chaff to rise in part of the winnowing cavity toward a chaff chute to be carried away by the fluid flow to a solid/air separator. Simultaneously, heavier density food products (e.g., cocao nibs) fall in the fluid to a selector chute below winnowing cavity and diverter wall. Further, for small food materials, bonded food/chaff pieces, and/or large chaff pieces having a density too great to pass into the chaff chute but too low to be drawn into the lower chute, these particles may then circulate around winnowing cavity to repeat the impacting and separating process, resulting in a finer degree of separation than may be produced from a single-pass winnowing chamber and/or existing winnowing systems.

FIG. 1 typically depicts a first perspective view of a first embodiment of the present novel winnower technology 100 (also referred to as winnower, winnowing apparatus, winnowing system). Winnower 100 typically may include exterior housing 105; housing connector 110; feed member 115; agitator 117; feed gate 120; feed chute 125; feed chute wall 130; plate member 135; winnowing cavity 140; selection chute 142; chaff chute 144; collection cavity 145; exhaust 150; exhaust gate 155; exhaust adapter 160; separator 165; and/or exhausting member 170.

Figure 1A:
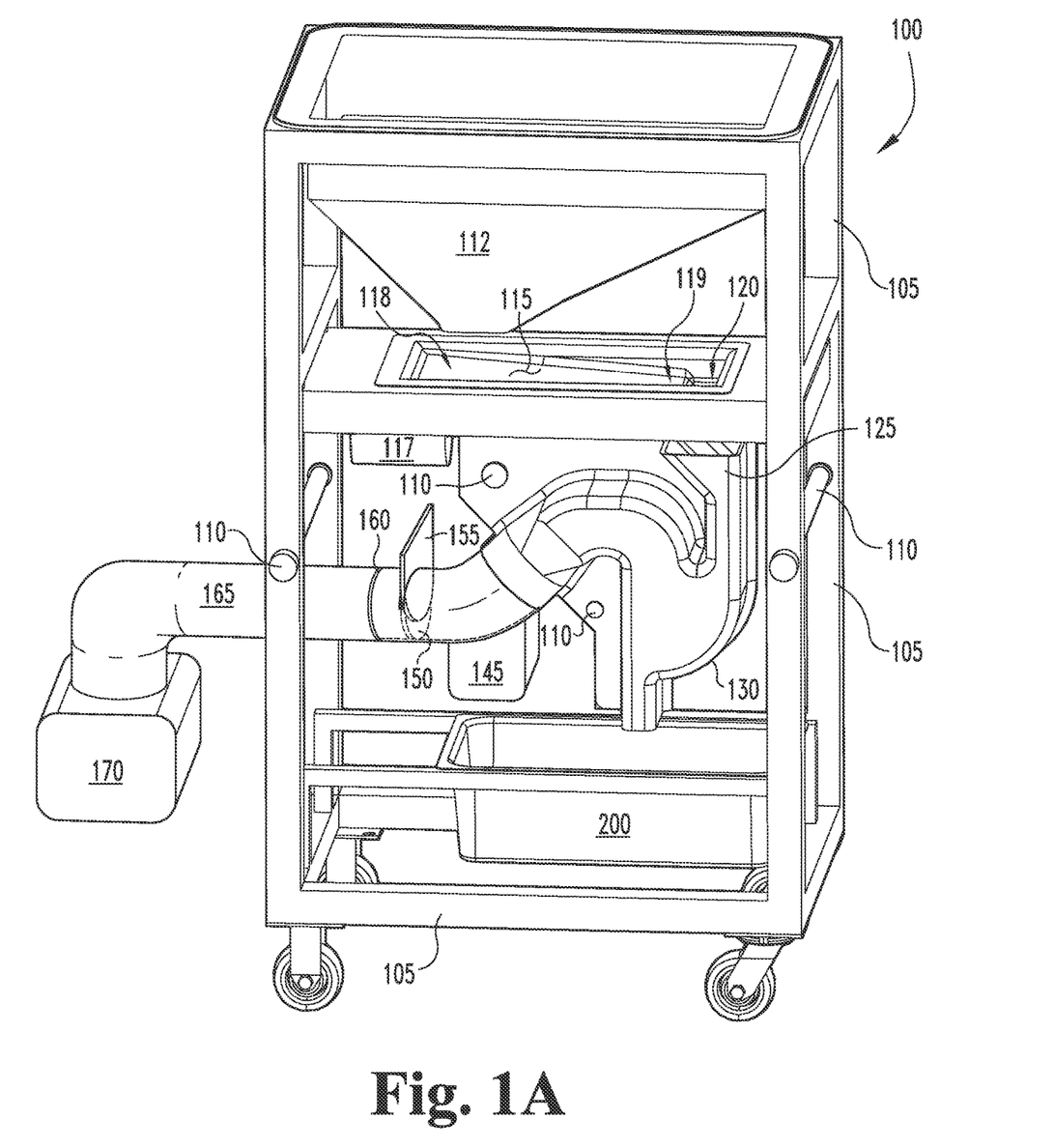
FIG. 1A is a first perspective view of a first embodiment of the present novel technology.
Figure 1B:
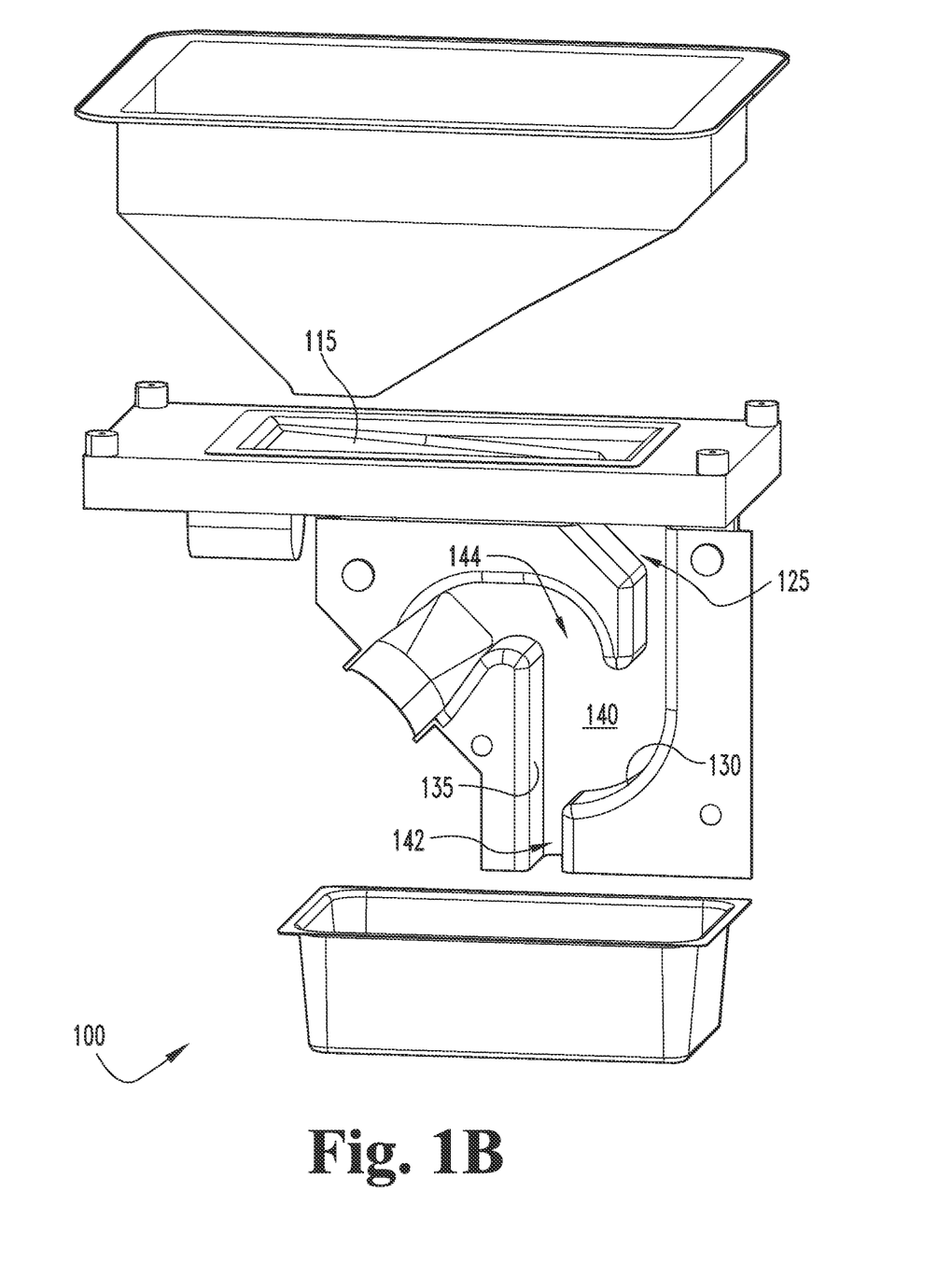
FIG. 1B is a first exploded partial perspective view of FIG. 1A.
Figure 1C:
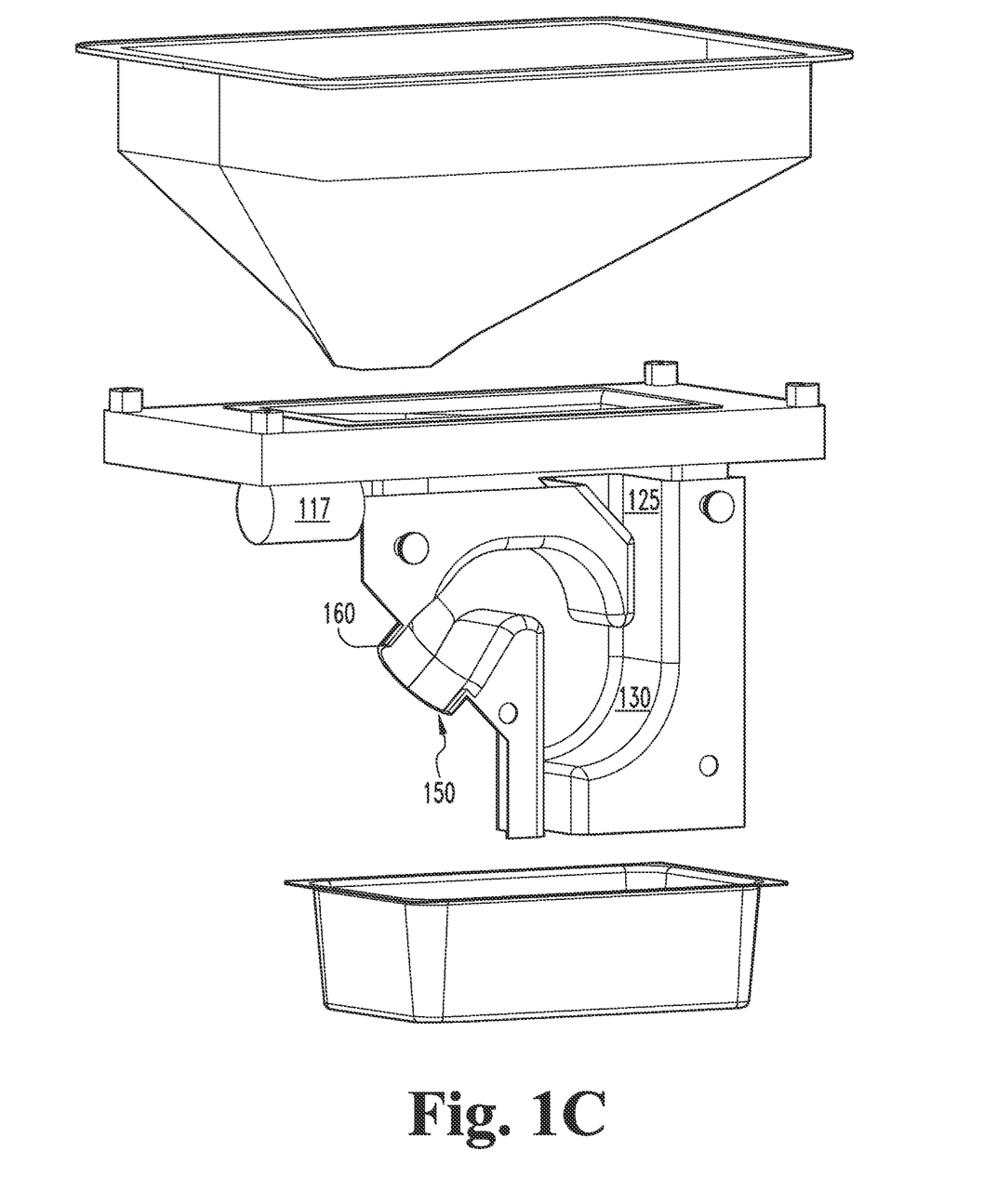
FIG. 1C is a second exploded partial perspective view of FIG. 1A.
Figure 1D:
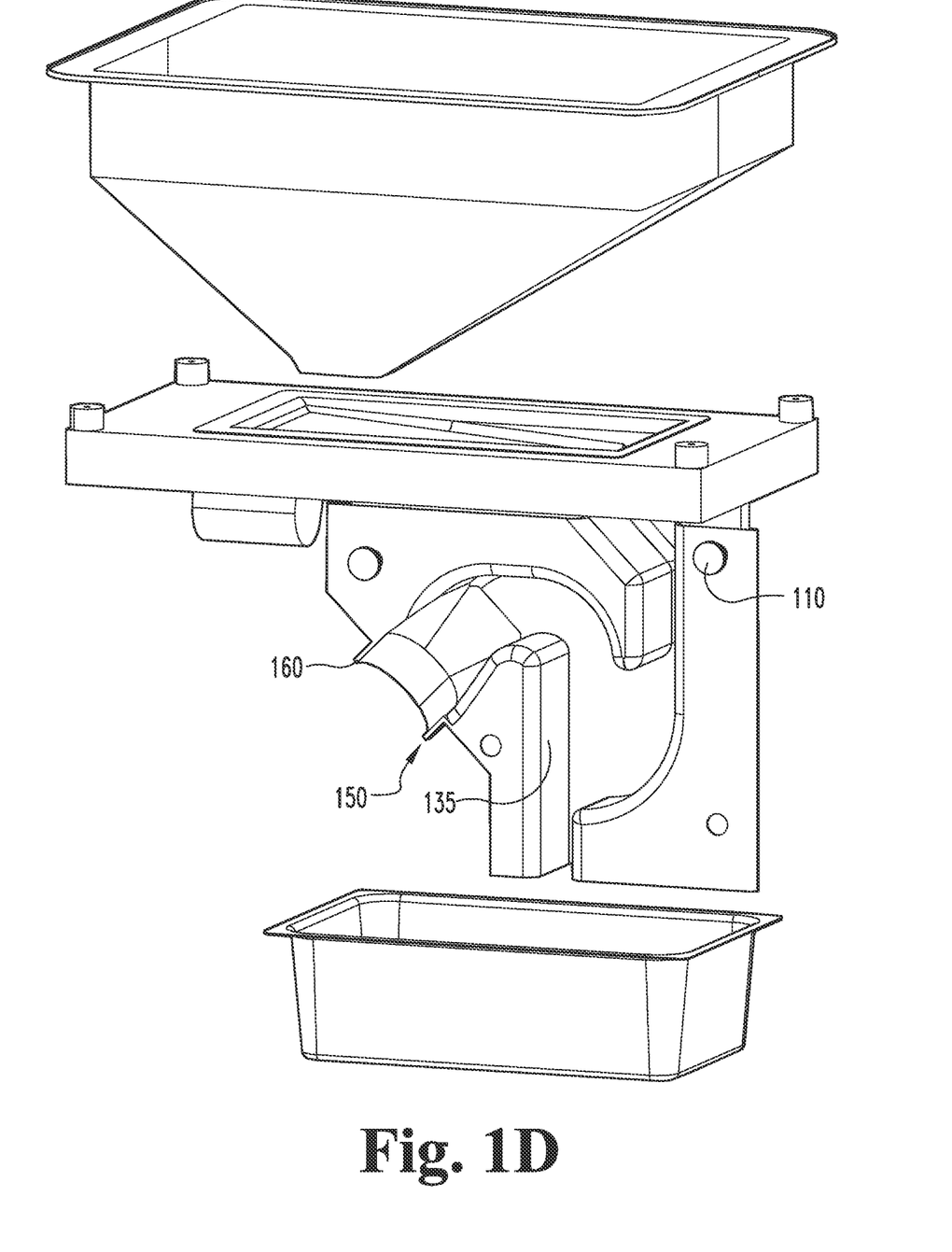
FIG. 1D is a third exploded partial perspective view of FIG. 1A.

Winnower 100 typically may be constructed such that one or more exterior housings 105 may be integral and/or separately connected. For example, exterior housing 105 may be a single exterior wall and/or container formed, milled, and/or otherwise formed to contain and/or system 100 components. Where housings 105 may be separate, as depicted in FIG. 1, one or more housing connectors 110 typically may connect the two or more exterior housings 105. For example, connectors 110 may adhere to, thread into, receive threading from, and/or otherwise operationally connect the two or more housings 105.

In some implementations, housing 105 may have one or more access panels through which an operator may service system 100 components. For example, a service panel may be located on either side of system 105 and substantially fluid tight when closed.

In other implementations, system 100 may be separated into two or more parts to increase ease of cleaning system 100 to create clamshell-like bifurcations, allowing an operator to open winnower 100 along the seam(s). For example, winnower 100 may be split along its central axis (i.e., such that feed member 115 and plate member may be divided in half), being removably, mechanically connected (e.g., including, but not limited to, bolts, clips, nuts, washers, hook and loop fabric, removable adhesives, bands, grooves, and/or the like) along the divide. Typically, components may be retained on one side of the split (e.g., entire plate member 135 may be retained on left divide), removably slotted in place (e.g., entire plate member 135 may slot into receiving structures on either side of device), and/or arbitrarily split along the divide (e.g., feed chute 125 may be split in half when system 100 is opened). Such division may allow for system 100 and/or components to be easily operated, cleaned, stored, and/or otherwise maintained. In some further implementations, system 100 and/or components may be constructed (e.g., via thermoforming, casting, hydroforming, CNCed, and/or the like) such that the separate sections may be assembled easily and/or with a greater degree of precision.

Winnower 100 typically may receive one or more initial food materials 175 at feed member 115, which may be described as a hopper in some embodiments. Feed member 115 may be formed of any desired material, but typically may be constructed of food grade plastics and/or metals. Feed member 115 typically may be oriented at a slight declination relative to gravity, such that food materials 175 may travel in a downward grade towards feed gate 120, from higher end 118 (depicted to the left of FIG. 1) and lower end 119 (depicted to the right of FIG. 1).

Feed gate 120 may typically be a moveable and/or static plate, which typically may help to control the feeding of the food materials along feed member 115. For example, if a large diameter food material is placed into feed member 115, gate 120 may be opened to allow only a single layer of the large food material through gate 120 at a time. In another example, if a small diameter food material is traveling on feed member 115, gate 120 may be used to control feed rate at a set volume of flow (e.g., opening gate 120 to two centimeters in height). Thus, use of a movable gate 120 may allow winnower 100 operator to select for and/or alter flow characteristics of food material feed rate into winnower 100.

In some implementations, feed member 115 may be supplemented and/or replaced with agitation via agitator 117, aeration via aeration grates and/or apertures (not shown), flow control structures (not shown), heating/cooling elements, and/or the like. Agitator 117 typically may be a static and/or dynamical-controlled agitation device, such as vibratory motor, acoustic vibration device, and/or the like. Depending on the desired food material flow rate and/or environmental characteristics, agitator 117 typically may be used to aid in flow rate control.

Feed gate 120 typically may control the rate at which food materials pass from feed member 115 into feed chute 125 and down feed chute wall 130. Feed chute 125 typically may be constructed to pass food materials from feed member 115 into winnowing cavity 140. Chute 125 typically may be constructed with smooth and/or semi-smooth materials, and/or augmented with agitation, aeration, and/or the like as with feed member 115. The food materials typically may be directed along feed chute wall 130 and sent at speed into plate member 135, typically causing food materials to incrementally and/or completely fracture for winnowing. Plate member 135 typically may be one or more resilient structures that receive impacting food materials and reflect impacted materials back into winnowing cavity 140. Further, in some implementations, the volume of inflow through feed chute 125 typically may be equal or substantially equal to a first volume, which will be factored into the sizing of selection chute 142 and/or chaff chute 144.

In some implementations, as food materials pass through feed chute 125, they typically may undergo acceleration greater than relative freefall velocity of the food material. This acceleration typically may be due to one or more fluid drafts (typically air) coming from feed chute 125, selection chute 142, chaff chute 144, which may ultimately be drawn through winnower 100 by exhausting member 170, such as a vacuum, fluidic pump, and/or other such device.

In some implementations, chaff chute 144 may be sized and/or otherwise configured such that chute 144 is capable of passing a sum volumetric flow rate of the individual volumetric flow rates of feed chute 125 and selection chute 142. When so sized, food materials in winnowing cavity 140 typically may accelerate down selection chute 125, impact plate member 135, and fracture and experience temporary weightlessness while circulating within winnowing cavity 140 due to the balanced fluid flows. Then, based on the relative density of the food material, winnowed food materials typically may cyclically reimpact plate member 135 to be winnowed further, travel down through selection chute 142, and/or travel up through chaff chute 144. Reimpacted food materials may then again circulate within winnowing cavity 140, and may again be selected for reimpacting plate member 135, selection chute 142, and/or chaff chute 145.

In some implementations, winnower 100 may be configured with a plurality of feed chutes 125, plate members 135, winnowing cavities 140, selection chutes 142, and/or chaff chutes 144. For example, one or more feed chutes 124 from one or more feed members 115 may travel into one or more plate members 135 and winnowing cavities 140 for winnowing. Such configurations may increase throughput, decrease system 100 redundancies (e.g., may power multiple winnowing cavities 140 from a single exhausting member 170), and/or the like.

Figure 3A:
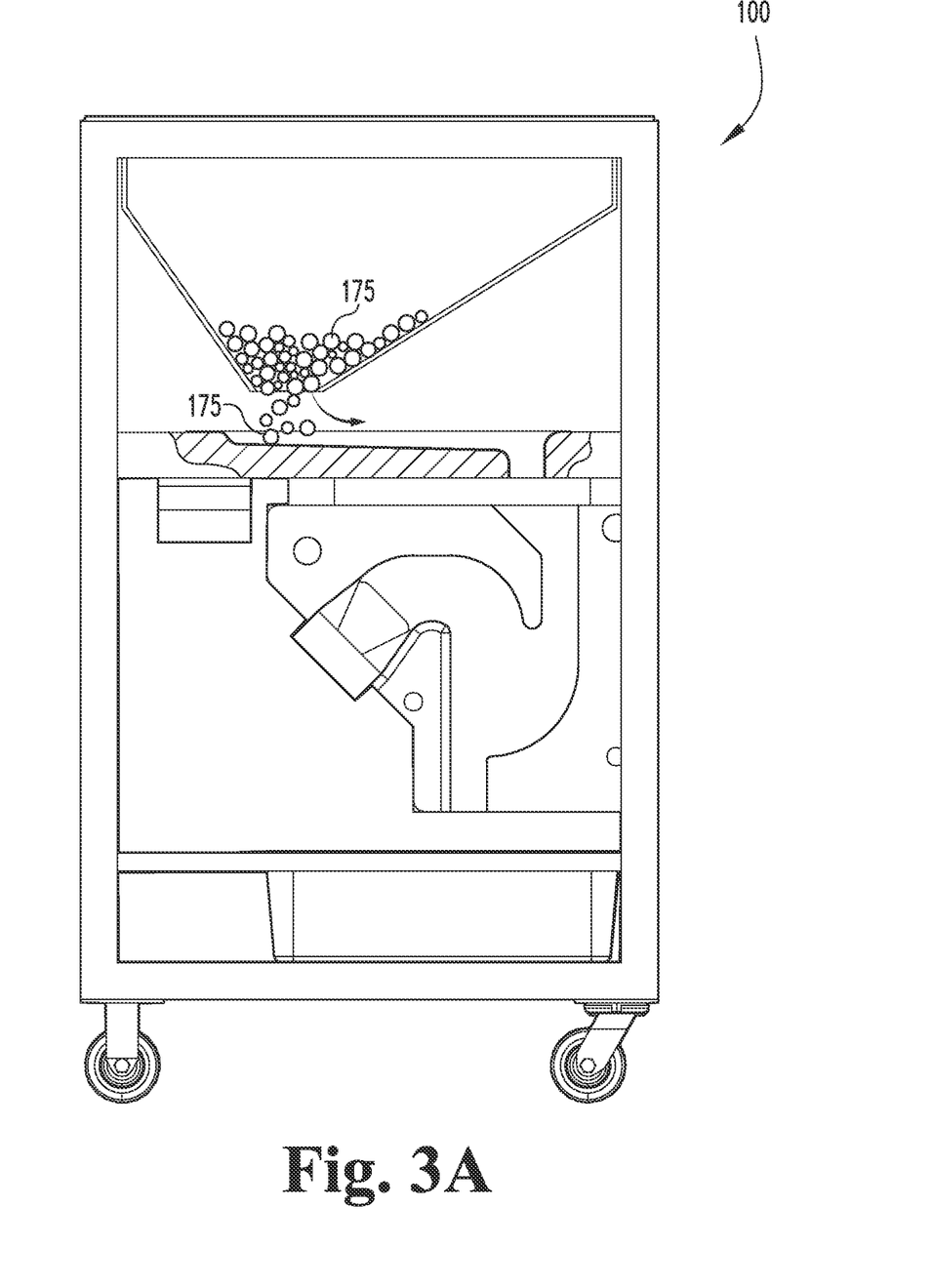
FIG. 3A depicts a first side perspective view of the first embodiment of the present novel technology, specifically during a loading stage.
Figure 3B:
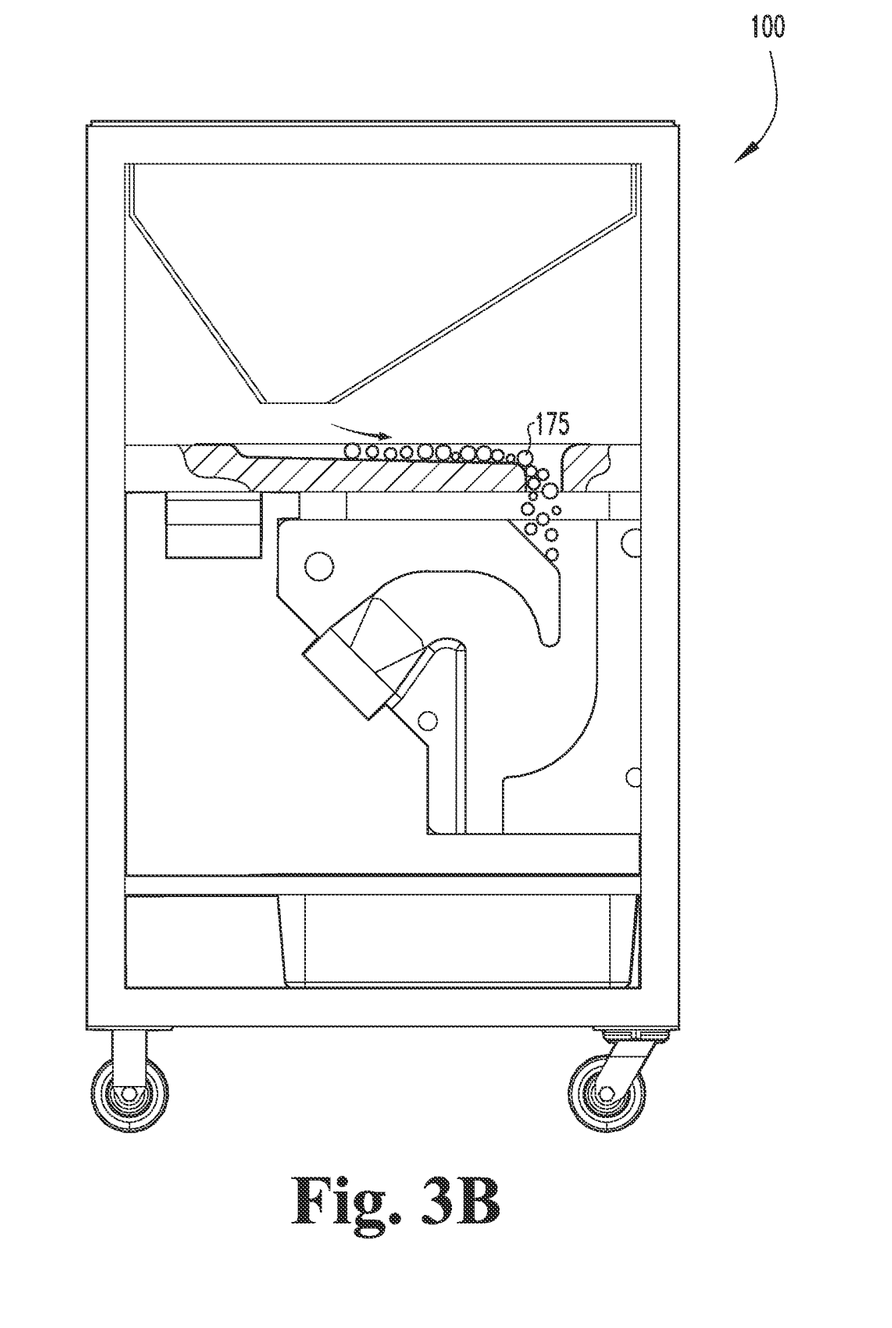
FIG. 3B depicts a second side perspective view of the first embodiment of the present novel technology, specifically during a feeding stage.
Figure 3C:
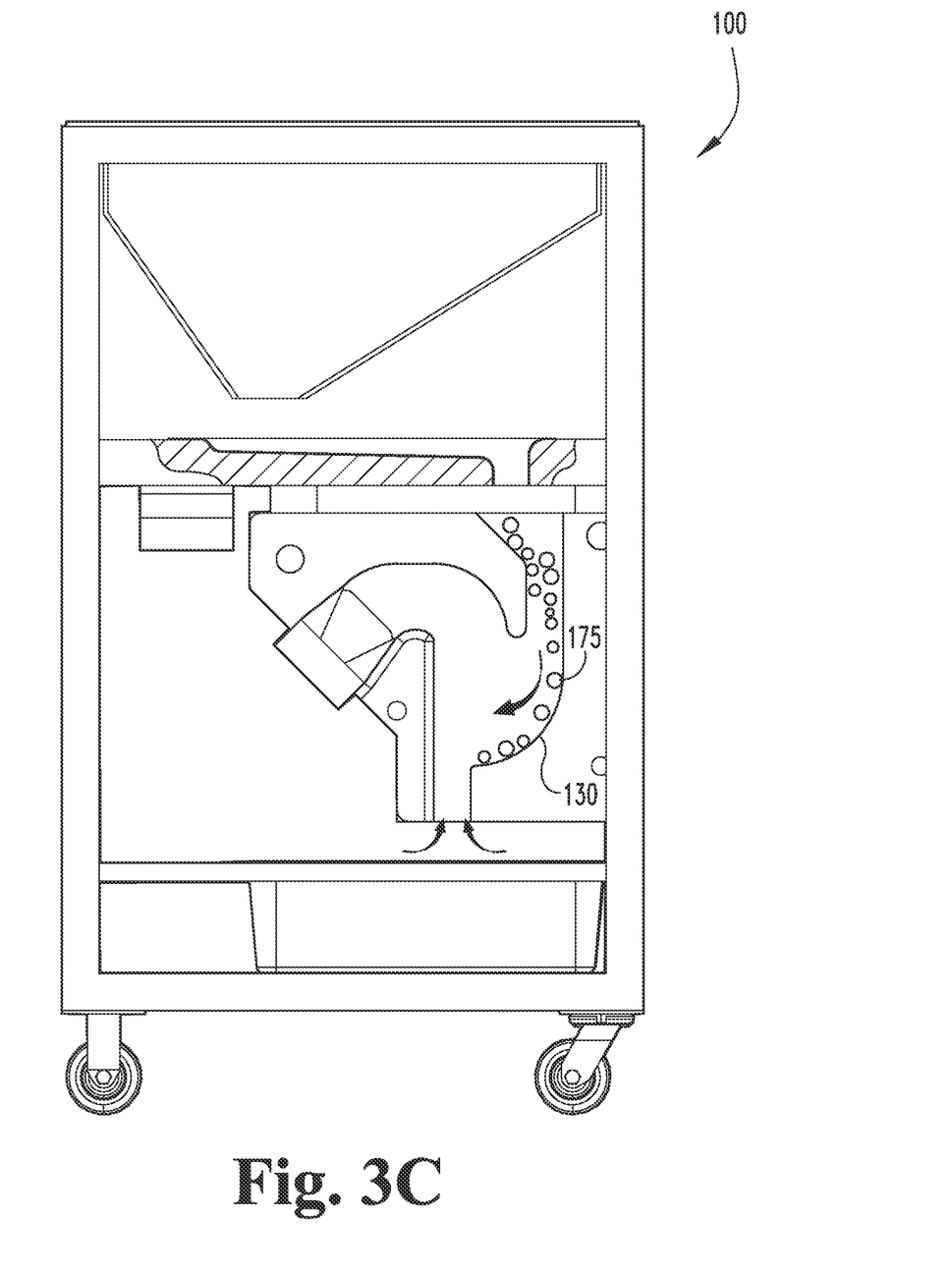
FIG. 3C depicts a third side perspective view of the first embodiment of the present novel technology, specifically during an impacting stage.
Figure 3D:
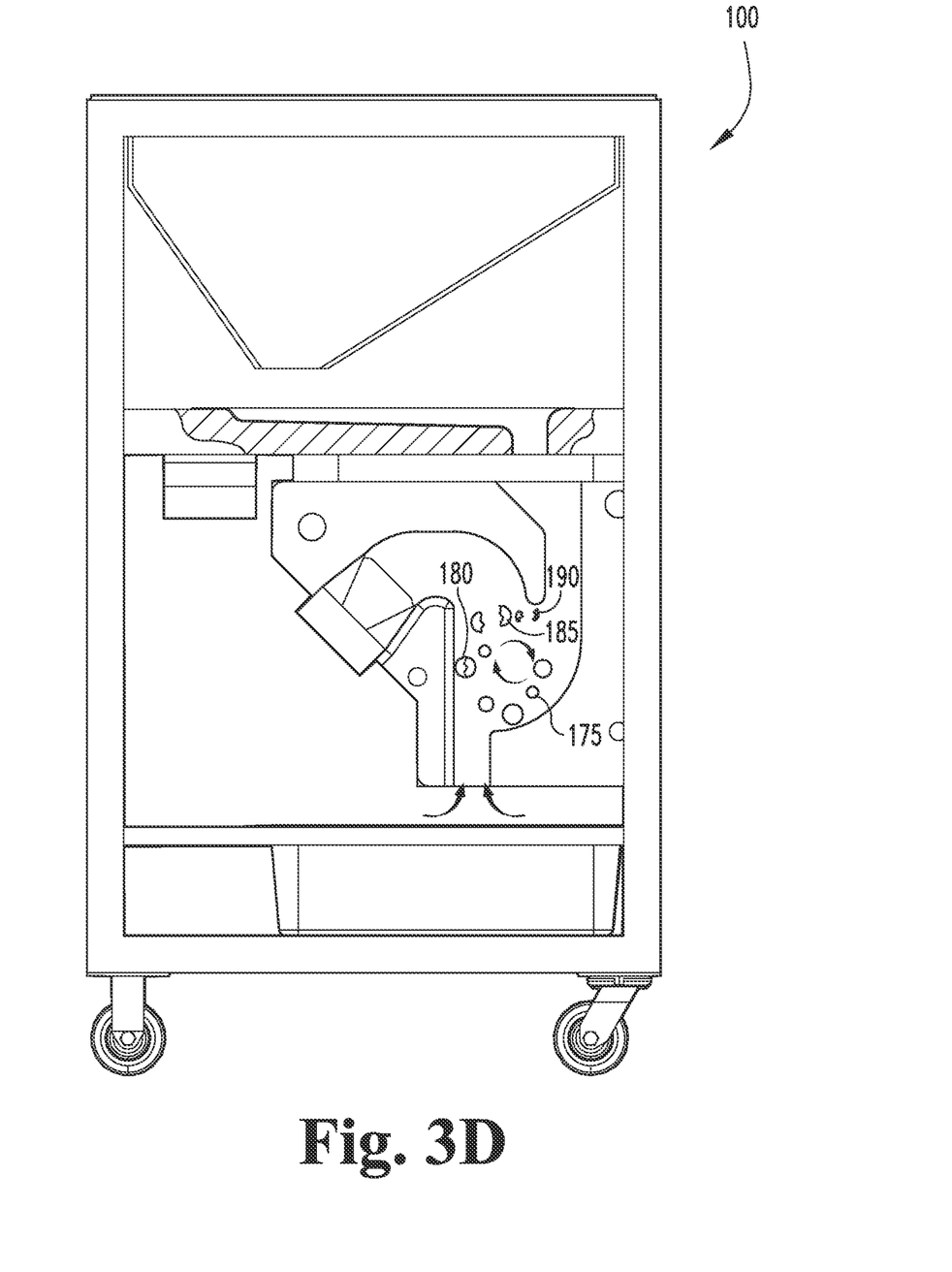
FIG. 3D depicts a fourth side perspective view of the first embodiment of the present novel technology, specifically during a circulating stage.
Figure 3E:
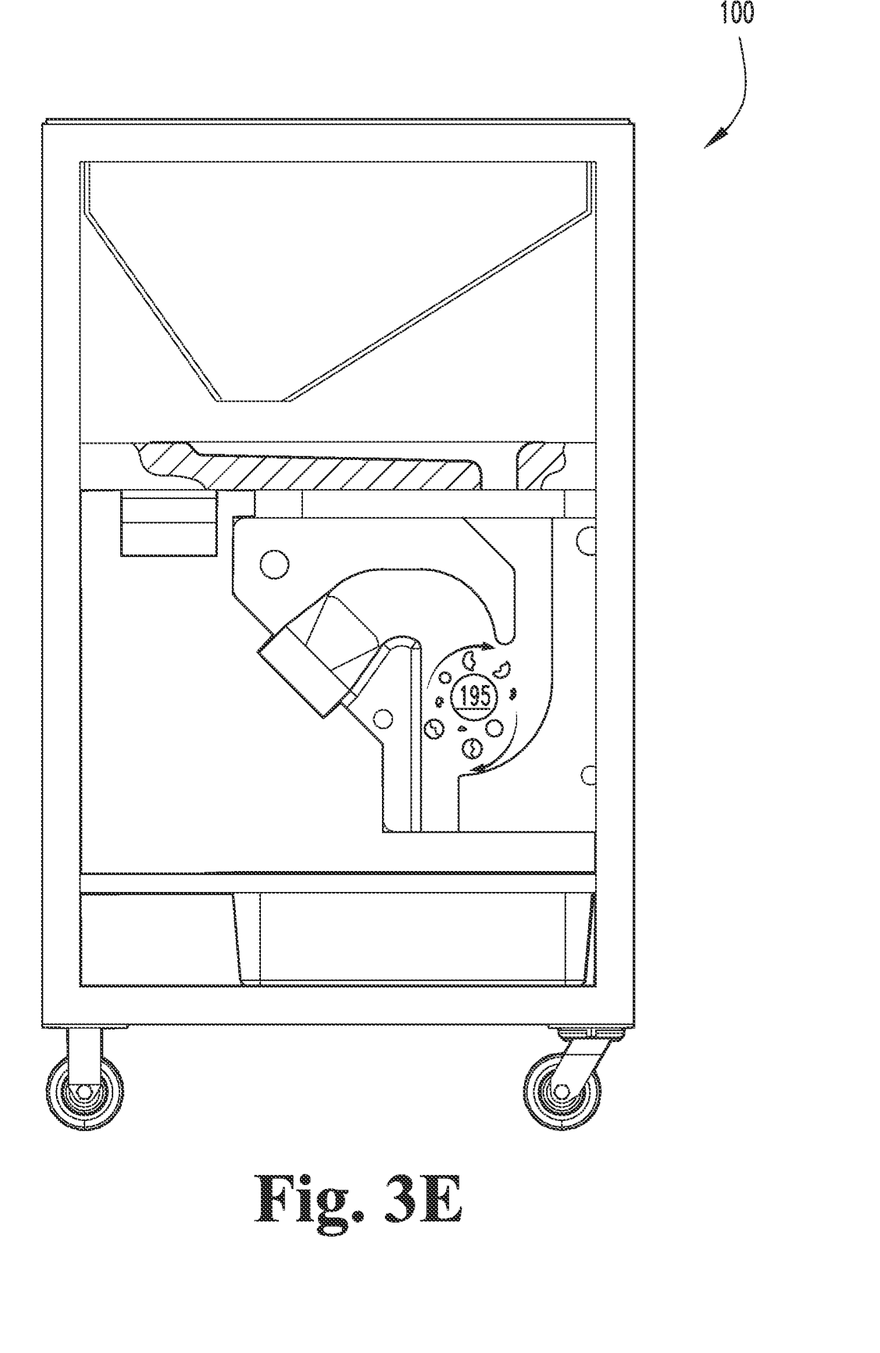
FIG. 3E depicts a fifth side perspective view of the first embodiment of the present novel technology, specifically during the circulating stage with cavity flow member.
Figure 3F:
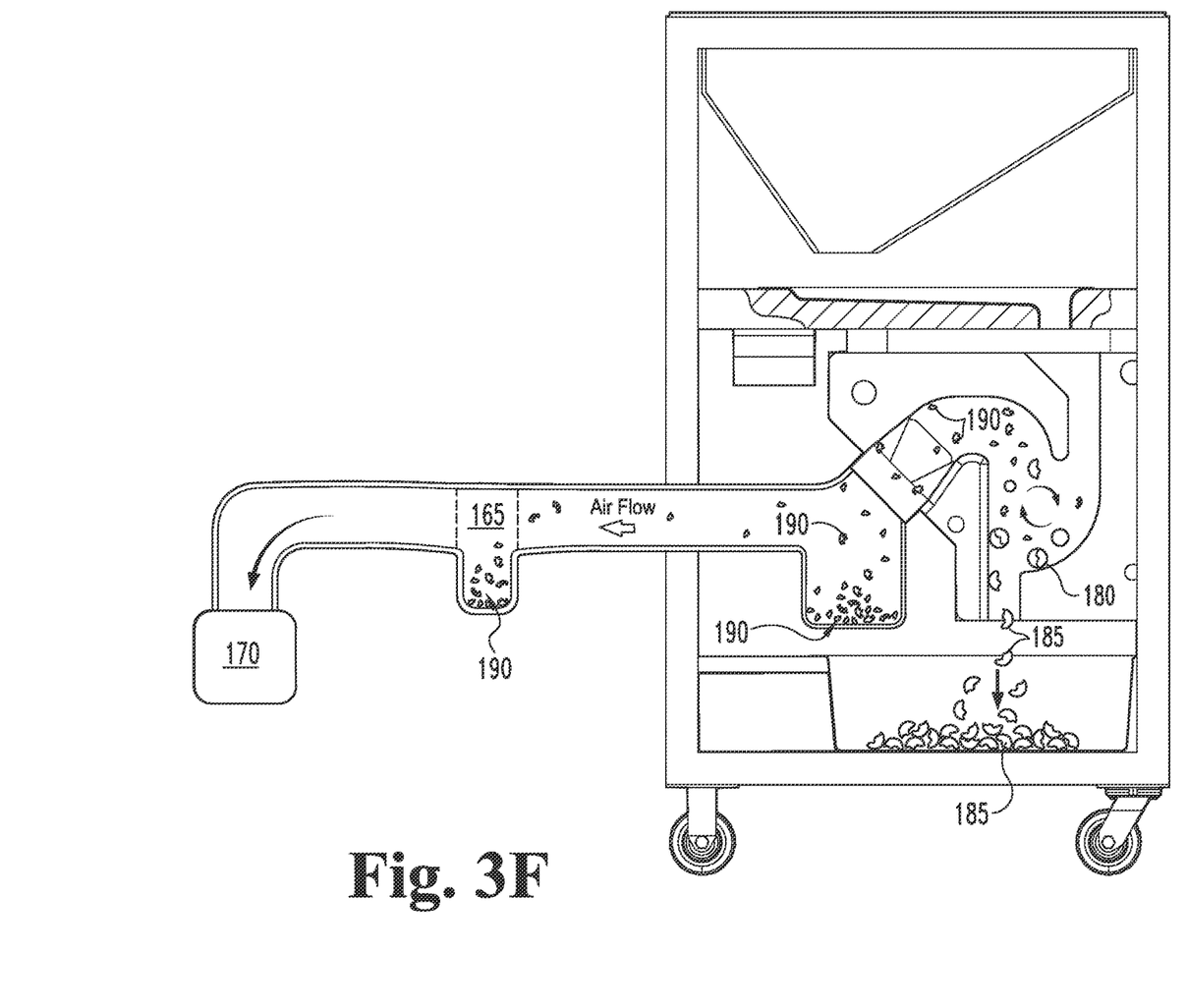
FIG. 3F depicts a sixth side perspective view of the first embodiment of the present novel technology, specifically during a selection stage.

Higher density food materials typically may fall through selection chute 142, typically into one or more collectors (e.g., processed materials collection 200, depicted in FIG. 3F). Conversely, lower density food materials typically may be drawn up through chaff chute 144 toward collection cavity 145 and exhaust 145. Collection cavity 145 typically may be a secondary collection cavity, which may allow some accidentally updrafted nibs or otherwise desired food material to be more easily recovered. These collected materials in cavity 145 may then be reintroduced into winnower 145 for additional processing and/or otherwise winnowed.

Additionally, collection cavity 145 may serve as a primary collection point for chaff products from the winnowing process, which typically may be discarded and/or recycled. Chaff products typically may be husks, shells, and/or other undesired detritus introduced into winnower 100. Alternatively, chaff products may travel into exhaust 150 past exhaust gate 155 and into exhausting member 170, which may cause damage to exhausting member 170 and/or other system 100 components.

Exhaust 145 typically may be one or more apertures allowing fluid (typically air) to be drawn through winnower 100 into exhausting member 170. In some implementations, exhaust gate 155, exhaust adapter 160, and/or separator 165 may be utilized to supplement exhaust functionality of system 100. Exhaust gate 155 typically may act as a filter and/or prefilter for chaff, and/or as a metering mechanism to increase or decrease flow rates. In some implementations, exhaust gate 155 may fixed, while in other implementations, exhaust gate 155 may be moveable and/interchangeable.

Exhaust adapter 160 typically may act to connect winnower 100 to a standard exhaust system (e.g., a two-inch household vacuum, four-inch industrial vacuum, and/or the like). In some implementations, exhaust adapter 160 may include additional filtering, locking, and/or display (i.e., flow rate, flow restriction, etc.) features.

In further implementations, separator 165 may be placed before exhausting member 170 to help remove debris from the exhausting fluid before the debris enters exhausting member 170. For example, separator 165 typically may be an air-solid separator, including but not limited to a vortex separator, cyclonic separator, spiral separator, and/or the like, but any separation mechanism to remove particulates from a fluid may be used.

Figure 2:
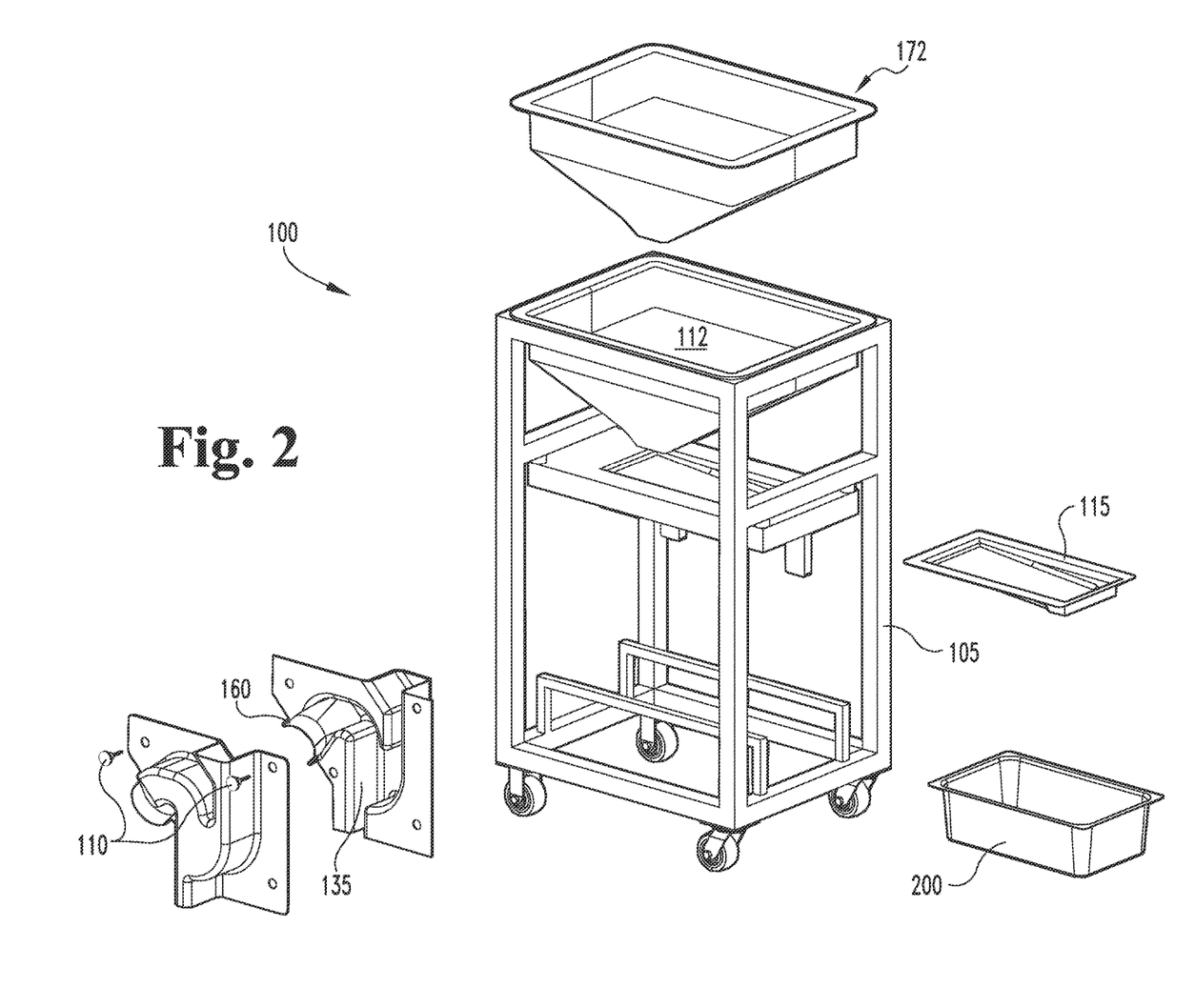
FIG. 2 is a second perspective view of the first embodiment of the present novel technology.

FIG. 2 typically depicts a second perspective view of the first embodiment of the present novel winnower apparatus 100, with preprocessor 172. Preprocessor 172 typically may be situated above winnower 100 and feed member 115 to deliver food materials.

Preprocessor 172 typically may be configured to preferentially deliver food materials into feed member 115. For example, preprocessor 172 may dice, score, heat, cool, mix, and/or otherwise prepare food materials to more easily be utilized by/for winnower 100. For example, where a food material may be hardened, irregularly sized, and/or otherwise more difficult to winnow, preprocessor 172 may dice beans to a relatively uniform, desired size, which may allow more consistent and efficient winnowing. Thus, for example, the preprocessor 172 may utilize a dicing plate that may range from, but is not limited to, six to ten millimeters, or a quarter to a half inch, cubes. This preparation also may decrease the superfine concentration in the food winnowing mixture by producing relatively consistent and predictable inputs to system 100.

In some further implementations, multiple winnowers 100 may be used in conjunction to sequentially perform a variety of processing tasks. For example, a first winnower 100 may include one or more heating elements to roast and/or flash roast food products, a second winnower 100 with a cooling system to rapidly cool roasted food products, and then a third winnower 100 to dice roasted and cooled food products. Thus, system 100 may have a modular design and capacity to process variable food products and demands with far greater ease and flexibility than currently available.

FIG. 3A-3F typically depict side perspective views of the first embodiment of the present novel winnowing system 100 during various stages of operation, which typically may also include unprocessed material 175; intermediate material 180; processed material 185; chaff material 190; cavity flow member 195; and/or processed material collector 200.

FIG. 3A typically depicts a first side perspective view of the first embodiment of the present novel technology, specifically during a loading stage. Initial material 175 typically is loaded into winnower 100 via feed member 115. In some implementations, one or more preprocessors 172 may be used, which may then manually, semi-automatically, and/or automatically feed into feed member 115. In some other implementations, preprocessor 172 may include feed controls, such as a metered solenoid gate, extrusion member, and/or the like to further control and/or optimize flow of materials 175 into winnower 100.

FIG. 3B typically depicts a second side perspective view of the first embodiment of the present novel technology, specifically during a feeding stage. At this point in the winnowing process, the flow rate of materials 175 into feed chute 125 may be controlled via one or more feed gates 120. Feed gates 120 allow the desired and/or optimal flow rate of materials 175 to enter into feed chute 125, which typically may minimize obstructions in the flow of materials 175 through winnower 100 and increase winnowed products.

FIG. 3C typically depicts a third side perspective view of the first embodiment of the present novel technology, specifically during an impacting stage. As described above, materials 175 typically may be accelerated down feed chute 125, along feed chute wall 130, and into plate member 135. Impacted materials 175 typically may then reflect into winnowing cavity 140 before circulating, reimpacting, dropping, and/or rising in cavity 140.

FIG. 3D typically depicts a fourth side perspective view of the first embodiment of the present novel technology, specifically during a circulating stage. After impacting and/or reimpacting plate member 135, initial material 175 typically may circulate in winnowing cavity 140. Initial materials 175 typically may remain whole and/or fracture into intermediate materials 180 (i.e., neither wholly processed nor wholly chaff), processed material 185 (i.e., the desired food product from the winnowing process), and/or chaff material 190 (i.e., the undesired detritus from the winnowing process). Materials 175, 180, 185, and/or 190 typically continue to circulate, impact, rise, and/or fall based on the density of the relative materials, eventually being selected for as desirable (i.e., typically higher density) through selection chute 142 or being selected as undesirable (i.e., typically lower density) and discarded through chaff chute 144.

Additionally, while referencing cocao winnowing determines that the higher density particles (i.e., nibs) are "desirable," in some implementations, lower density particles may be desirable over higher density products, and effectively the collection points for the chaff 190 and desired food products 185 may be reversed. Thus, collection of the desired material would be at the collection cavity 145 and/or separator 165, rather than below selection chute 142.

FIG. 3E typically depicts a fifth side perspective view of the first embodiment of the present novel technology, specifically during the circulating stage with cavity flow member 195.

Cavity flow member 195 typically may be a typically central object (e.g., sphere, cylinder, and/or the like) that helps direct circulation within winnowing cavity 140. Cavity flow member 195 may be configured to preferentially direct fluid flow in one direction (e.g., clockwise, as depicted in FIG. 3E) to reduce particulate collisions in cavity 140, which may increase circulation and separation efficiency.

FIG. 3F typically depicts a sixth side perspective view of the first embodiment of the present novel technology, specifically during a selection stage.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system 105 components in the embodiments described above should not be understood as requiring such separation in all embodiments, and it should be understood that the described program components and systems may typically be integrated together in a single hardware and/or software product or packaged into multiple hardware and/or software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for winnowing, comprising the steps of:
   loading an initial material into a winnowing system via a feed member;
   feeding the initial material into a fluidically accelerated winnowing cavity;
   circulating the initial material within the winnowing cavity, wherein a downdraft of fluid accelerates and redirects the initial material from vertical to horizontal flow;
   repeatedly impacting the initial material against at least one plate member to yield chaff material and processed material; and
   separating the chaff material and the processed material from the winnowing cavity based on density;
   wherein the winnowing cavity is in fluidic communication with a plurality of fluidic inlets and a single fluidic outlet; and
   wherein fluid flow from the plurality of fluidic inlets sums to act on the initial material to urge the initial material into the plate member.

2. The method of claim 1, wherein the initial material further yields intermediate material.

3. The method claim of 2, wherein the intermediate material reimpacts the at least one plate member until yielding chaff material and processed material.

4. The method claim of 1, further comprising the step of preprocessing the initial material with a preprocessor.

5. The method claim of 1, further comprising the step of controlling the flow of initial material into the winnowing cavity with a feed gate.

6. The method claim of 1, wherein the chaff material egresses the winnowing cavity via a chaff chute.

7. The method claim of 6, wherein the chaff material collects in a collection cavity.

8. The method claim of 1, wherein the processed material egresses the winnowing cavity via a selection chute.

9. The method claim of 1, further comprising the step of agitating the feed member with at least one agitator.

10. The method claim of 1, further comprising the step of urging a fluid using an exhausting member through the feed member, the winnowing cavity, and the collection cavity.

11. A winnowing system, comprising:
    at least one exterior housing;
    at least one feed member disposed at higher elevation within the at least one exterior housing, wherein the at least one feed member has a higher feed end and a lower feed end;
    at least one feed chute connected to the lower feed end of the at least one feed member, wherein the at least one feed chute is bounded by at least one feed chute wall;
    at least one winnowing cavity disposed at an end of the at least one feed chute and opposite from the lower feed end and having a vertically oriented plate member disposed therein;
    at least one chaff chute disposed gravitationally above the at least one winnowing cavity;
    at least one selection chute disposed gravitationally below the winnowing cavity; and
    at least one exhausting member in fluidic communication with the at least one feed member, the at least one feed chute, the at least one winnowing cavity, the at least one chaff chute, and the at least one collection cavity;
    wherein the at least one exhausting member urges at least one fluid through the winnowing system;
    wherein the at least one selection chute and the at least one feed chute direct air flow into the winnowing cavity at a respective at least one selection chute volumetric flow rate and a respective at least one feed chute volumetric flow rate;
    wherein the at least one selection chute volumetric flow rate and the at least one feed chute volumetric flow rate sum to yield a sum volumetric flow rate of the air flowing onto the vertically oriented plate member; and
    wherein the air flowing onto the vertically oriented plate member repeatedly propels particles in the winnowing cavity into the vertically oriented plate member.

12. The winnowing system of claim 11, further comprising at least one collection cavity disposed before at the end of the at least one chaff chute.

13. The winnowing system of claim 11, further comprising a material preprocessor disposed adjacent to the at least one feed member, wherein the preprocessor preprocesses an initial material.

14. The winnowing system of claim 11, further comprising at least one feed gate separating the at least one feed member and the at least one feed chute.

15. A winnower apparatus, comprising:
    an exterior housing;
    a material feed member having a higher end and a lower end and located substantially within the exterior housing;
    a feed chute connected to the lower end, the feed chute having a feed chute wall;
    a winnowing cavity disposed after the feed chute and opposite the lower end;
    an impact plate disposed in the winnowing cavity;
    a selection chute disposed opposite the feed chute and pneumatically connected to the winnowing cavity;
    a chaff chute disposed above the winnowing cavity; and
    an exhausting member in fluidic communication with the feed member, the feed chute, the winnowing cavity, the chaff chute, the selection chute, and the collection cavity;
    wherein the exhausting member urges a fluid from the feed chute and the selection chute through the winnowing cavity to winnow an initial material;
    wherein the fluid from the feed chute and the selection chute combine to repeatedly urge particles in the winnowing cavity against the impact plate to separate chaff therefrom.

16. The winnower apparatus of claim 15, further comprising a collection cavity disposed after the chaff chute and opposite from the winnowing cavity.

17. The winnower apparatus of claim 15, further comprising a material preprocessor located before the feed member, wherein the preprocessor preprocesses an initial material.

18. The winnower apparatus of claim 15, further comprising at least one agitator operationally connected to the feed member to urge an initial material across into the feed chute.

* * * * *